(12) United States Patent
Kim

(10) Patent No.: US 9,185,329 B2
(45) Date of Patent: Nov. 10, 2015

(54) DISPLAY APPARATUS, POWER SUPPLY APPARATUS AND POWER SUPPLY METHOD TO MINIMIZE WASTEFUL POWER CONSUMPTION

(75) Inventor: Young-soo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 849 days.

(21) Appl. No.: 12/902,208

(22) Filed: Oct. 12, 2010

(65) Prior Publication Data

US 2011/0096052 A1 Apr. 28, 2011

(30) Foreign Application Priority Data

Oct. 23, 2009 (KR) ........................ 10-2009-0101303

(51) Int. Cl.
*G06F 3/038* (2013.01)
*G09F 5/00* (2006.01)
*H04N 5/63* (2006.01)

(52) U.S. Cl.
CPC ...................................... *H04N 5/63* (2013.01)

(58) Field of Classification Search
CPC .... G09G 2300/00–2300/12; G09G 2330/0828
USPC ............................ 45/211–213; 345/211–213
See application file for complete search history.

(56) References Cited

U.S. PATENT DOCUMENTS

| | | | | |
|---|---|---|---|---|
| 5,140,511 A * | 8/1992 | Lee et al. | ................... | 363/21.07 |
| 2005/0052886 A1 * | 3/2005 | Yang et al. | ...................... | 363/49 |
| 2008/0291154 A1 * | 11/2008 | Huang | ........................... | 345/102 |
| 2009/0085906 A1 * | 4/2009 | Zheng et al. | .................. | 345/212 |
| 2011/0068751 A1 * | 3/2011 | Lin et al. | ....................... | 320/166 |

FOREIGN PATENT DOCUMENTS

JP 2000184718 A 6/2000

OTHER PUBLICATIONS

Communication dated May 20, 2015, issued by the Korean Intellectual Property Office in counterpart Korean Patent Application No. 10-2009-0101303.

* cited by examiner

*Primary Examiner* — Sanghyuk Park
(74) *Attorney, Agent, or Firm* — Sughrue Mion, PLLC

(57) ABSTRACT

A display apparatus, a power supply apparatus and a power supply method are provided. The display apparatus display apparatus includes: a signal receiving unit which receives an image signal; a signal processing unit which processes the image signal; a display unit which displays an image based on the image signal processed by the signal processing unit; and a power supply unit which receives AC power and supplies operation power to the display unit. The power supply unit includes a discharging circuit part which includes a discharging element which discharges the power supply unit to remove a residual voltage from the power supply unit when the AC power is suspended, the discharging circuit part preventing the discharging element from consuming power when the AC power is input. It is possible to minimize wasteful power consumption caused by a discharging element provided to guarantee user's safety against a residual voltage.

11 Claims, 5 Drawing Sheets

DISPLAY APPARATUS, POWER SUPPLY APPARATUS AND POWER SUPPLY METHOD TO MINIMIZE WASTEFUL POWER CONSUMPTION

CROSS-REFERENCE TO RELATED APPLICATION

This application claims priority from Korean Patent Application No. 10-2009-0101303, filed on Oct. 23, 2009 in the Korean Intellectual Property Office, the disclosure of which is incorporated herein by reference.

BACKGROUND

1. Field

Methods and devices consistent with the exemplary embodiments relate to a display apparatus, a power supply apparatus and a power supply method thereof, and more particularly, to minimizing wasteful power consumption generated in a discharging device which discharges a residual voltage when AC power stops being supplied.

2. Description of the Related Art

A display apparatus such as a TV or the like is equipped with a power supply unit, for example, a switched-mode power supply (SMPS), for supplying operation power. Such a power supply unit converts commercial utility AC power into operation power of different levels required for various components of the display apparatus.

A typical power supply unit includes circuit elements, for example, capacitors used for AC filtering, which are charged with a considerable voltage in normal operation. Accordingly, in order to prevent a user from being electrically shocked by the charged voltage (hereinafter also referred to as "residual voltage"), when the user unplugs a power cord, the power supply unit is provided with a discharging resistor for discharging the residual voltage.

However, in the related art, since such a discharging resistor is constantly connected in the power supply unit, a discharged current may flow through the discharging resistor not only when the discharging resistor protects the user who unplugs the power cord, but also when the AC power is normally supplied to the components of the display apparatus, which may result in wasteful power consumption.

More particularly, the AC power is supplied to the power supply unit even when the display apparatus is in a standby mode to minimize power consumption. Since the display apparatus is not normally operated in the standby mode, a significant amount of power is wasted.

Such wasteful power consumption caused by the discharging resistor may occur in not only the display apparatus but also various forms of electronic devices with the above-mentioned power configuration.

SUMMARY

Accordingly, one or more exemplary embodiments provide a display apparatus, a power supply apparatus and a power supply method thereof, which are capable of minimizing wasteful power consumption caused by a discharging element provided to guarantee a user's safety against a residual voltage when a user unplugs a power cord.

Additional aspects will be set forth in part in the description which follows and, in part, will be apparent to one skilled in the art from the description, or may be learned by practice of the exemplary embodiments.

The foregoing and/or other aspects may be achieved by providing a display apparatus including: a signal receiving unit which receives an image signal; a signal processing unit which processes the image signal received by the signal receiving unit; a display unit which displays an image based on the image signal processed by the signal processing unit; and a power supply unit which receives AC power and supplies operation power to the display unit, wherein the power supply unit includes a discharging circuit part which includes a discharging element which allows the power supply unit to discharge a residual voltage therefrom when the AC power is suspended, the discharging circuit part preventing the discharging element from consuming power when the AC power is input.

The discharging circuit part may further include a first switching part which regulates a flow of current passing through the discharging element; and a switch control part which controls the first switching part to prevent the current from flowing through the discharging element when the AC power is input.

The switch control part may include a voltage charging part which is charged with a turn-on voltage to turn on the first switching part; a second switching part which regulates a discharging path of the turn-on voltage charged in the voltage charging part; and an RC circuit part which turns on the second switching part so that the turn-on voltage charged in the voltage charging part can be discharged when the residual voltage is a DC voltage.

The RC circuit part may switch the second switching part so that the first switching part can be turned off by the turn-on voltage of the voltage charging part in a standby mode for power saving.

The discharging circuit part may further include a first diode and a second diode which are respectively provided on discharging paths of the power supply unit in association with a positive voltage and a negative voltage of the AC power, respectively.

The power supply unit may further include an AC filter part which filters the AC power, and the discharging element may allow the AC filter part to discharge the residual voltage therefrom.

The foregoing and/or other aspects may be achieved by providing a power supply apparatus for an electronic apparatus, including: an AC filter part which receives and filters AC power; a rectifier part which rectifies an output current of the AC filter part; a switching circuit part which converts an output voltage of the rectifier part into an operation voltage of the electronic apparatus; and a discharging circuit part which allows a discharging element which discharges the AC filter part to discharge a residual voltage therefrom when the AC power is suspended, the discharging circuit part preventing the discharging element from consuming power when the AC power is input.

The discharging circuit part may further include: a first switching part which regulates a flow of current passing through the discharging element; and a switch control part which controls the first switching part to prevent the current from flowing through the discharging element when the AC power is input.

The switch control part may include: a voltage charging part which is charged with a turn-on voltage to turn on the first switching part; a second switching part which regulates a discharging path of the turn-on voltage charged in the voltage charging part; and an RC circuit part which turns on the second switching part so that the turn-on voltage charged in the voltage charging part can be discharged when the residual voltage is a DC voltage.

The RC circuit part may control the second switching part so that the first switching part can be turned off by the turn-on voltage of the voltage charging part in a standby mode for power saving.

The power supply unit may further include a first diode and a second diode which are respectively provided on discharging paths of the AC filter part in association with a positive voltage and a negative voltage of the AC power, respectively.

The foregoing and/or other aspects may be achieved by providing a power supplying method of receiving AC power and supplying operation power to an electronic apparatus, including: checking whether the AC power is input; and allowing a power supply unit to discharge a residual voltage therefrom using a discharging element when the AC power is suspended, and preventing the discharging element from consuming power when the AC power is input.

The preventing may include preventing a current from flowing through the discharging element when the AC power is input.

The preventing may include preventing the current from flowing through the discharging element in response to conversion of the residual voltage of the power supply unit into a DC voltage.

The preventing may include preventing the current from flowing through the discharging element in a standby mode for power saving.

The allowing may include allowing the power supply unit to discharge the residual voltage therefrom along different discharging paths in association with a positive voltage and a negative voltage of the AC power, respectively.

According to one or more exemplary embodiments, when operation power is supplied to an electronic apparatus such as a display apparatus or the like, it is possible to minimize wasteful power consumption caused by a discharging element provided to guarantee a user's safety against a residual voltage when a user unplugs a power cord.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
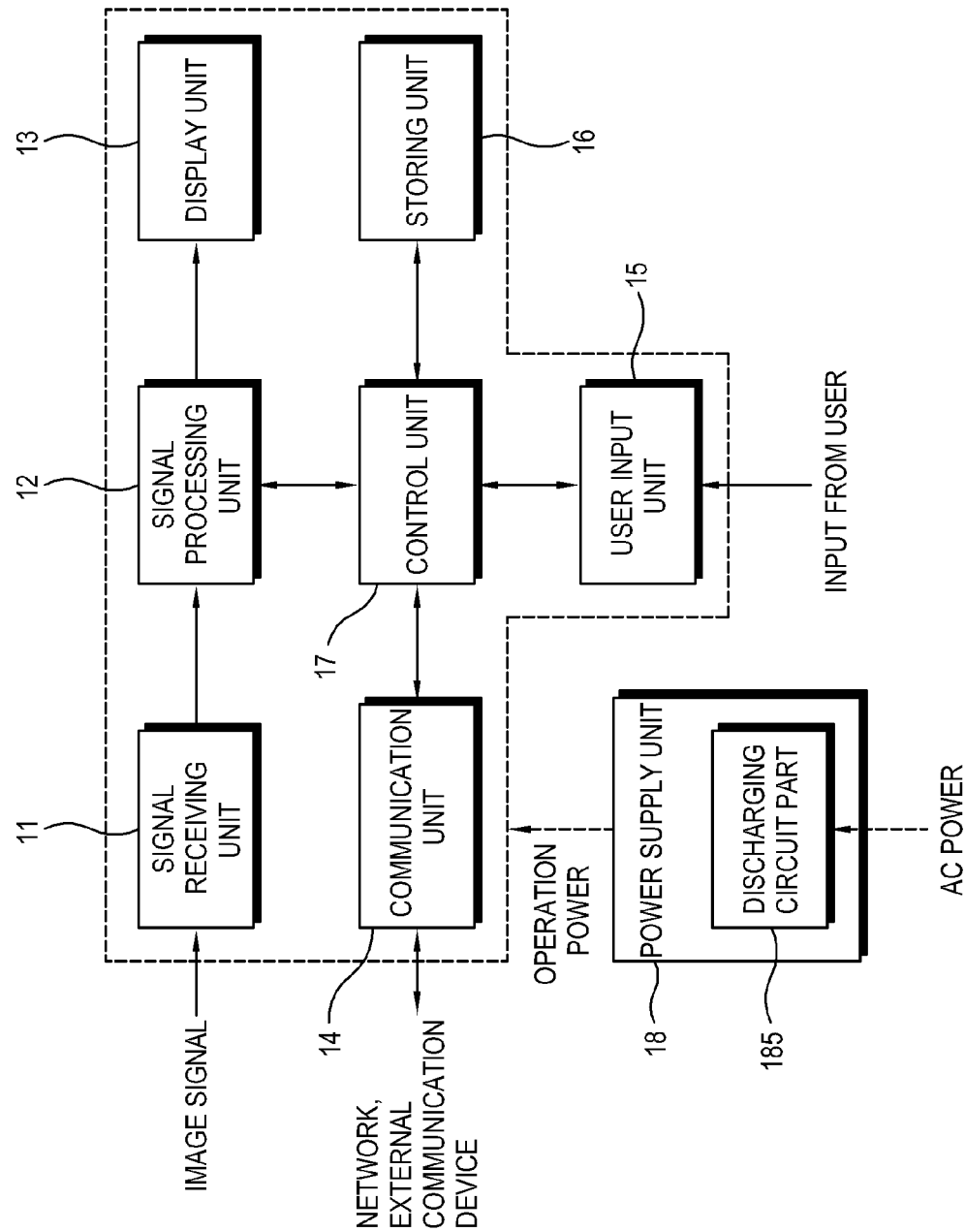
FIG. 1 is a block diagram showing a configuration of a display apparatus according to one exemplary embodiment.

Reference will now be made in detail to the exemplary embodiments, which are illustrated in the accompanying drawings, so that those in the art can easily practice the exemplary embodiments. The exemplary embodiment disclosed herein are not to be construed as limiting, but may be implemented in different forms.

In the following exemplary embodiments, for the purpose of clarity, the same components are denoted by the same reference numerals throughout the drawings, and explanation thereof will be representatively given in a first exemplary embodiment but will be omitted in other exemplary embodiments.

FIG. 1 is a block diagram showing a configuration of a display apparatus 1 according to an exemplary embodiment.

The display apparatus 1, which may be implemented by a TV or the like, receives and processes image signals and displays images based on the processed image signals. As shown in FIG. 1, the display apparatus 1 includes a signal receiving unit 11, a signal processing unit 12, a display unit 13, a communication unit 14, a user input unit 15, a storing unit 16 and a control unit 17.

The signal receiving unit 11 receives an image signal. The image signal received by the signal receiving unit 11 includes a broadcasting signal such as a DTV signal and a cable broadcasting signal. In this case, the signal receiving unit 11 may tune and receive a broadcasting signal of a channel selected by a user under control of the control unit 17. In addition, the image signal received by the signal receiving unit 11 may further include signals which are output from imaging devices such as a DVD, BD and the like. Further, although not shown, the signal receiving unit 11 may receive an audio signal for audio output, a data signal for data output, and other signals. In this exemplary embodiment, the image signal, the audio signal and the data signal may be altogether received as a single signal.

The signal processing unit 12 performs a predetermined signal processing for the image signal received by the signal receiving unit 11 so that an image can be displayed on the display unit 13. The image processing performed by the signal processing unit 12 includes decoding, image enhancing, scaling, and so on. In addition, the signal processing unit 12 may perform processing for the voice signal and the data signal received by the signal receiving unit 11.

The display unit 13 displays the image based on the image signal processed by the signal processing unit 12. The display unit 13 may display the image using an LCD scheme. In this case, although not shown, the display unit 13 may include an LCD panel, a panel driver, a backlight and so on. The display unit 13 may further display data information included in the data signal processed by the signal processing unit 12.

In addition, the display apparatus 1 may further include an audio output unit such as a speaker which can output an audio based on the audio signal processed by the signal processing unit 12.

The communication unit 14 communicates with external communication devices (not shown) through a network such as Internet or the like. In addition, the communication unit 14 may communicate with external communication devices (not shown) using a local area network system such as Bluetooth or the like. The communication unit 14 may transmit/receive information to/from a counterpart communication device under control of the control unit 17. The information transmitted from the counterpart communication device to the communication unit 14 may include at least one of an image, audio and data which may be output through the display unit 13 and the like after being subjected to their respective proper process.

The user input unit 15 may be implemented by, for example, a remote controller, a manipulation panel or the like for receiving an input from a user. The user input unit 15 may include an input key for selecting power-on/off of the display apparatus 1. The user input received by the user input unit 15 is delivered to the control unit 17.

The storing unit 16 may be implemented by a nonvolatile memory, for example, a flash memory, a hard disk or the like for storing data and information to be used in the display apparatus 1.

The control unit 17 controls various components of the display apparatus 1 and may include a firmware as a control program and a CPU and a RAM for executing the firmware.

The display apparatus 1 may further include a power supply unit 18 for supplying operation power to various components such as the display unit 13 and so on, as shown in FIG. 1. The power supply unit 18 receives commercial AC power and converts it into various levels of power required to operate the various components. In FIG. 1, detailed paths for the supply of power from the power supply unit 18 to the various components will be omitted for the sake of convenience.

In one exemplary embodiment, the power supply unit 18 may further include a discharging circuit part 185. The discharging circuit part 185 includes a discharging element (see 61 in FIG. 2) for discharging a residual voltage remaining in the power supply unit 18 in response to possible suspension of the AC power. The discharging element 61 serves to prevent a user from being electrically shocked by the residual voltage, for example when a power cord (see 31 in FIG. 2) is unplugged during operation of the apparatus. In addition, in one exemplary embodiment, the discharging circuit part 185 can prevent the discharging element 61 from consuming power when the AC power is input, thereby minimizing wasteful power consumption. Hereinafter, the power supply unit 18 according to one exemplary embodiment will be described in more detail with reference to FIGS. 2 to 4.

Figure 2:
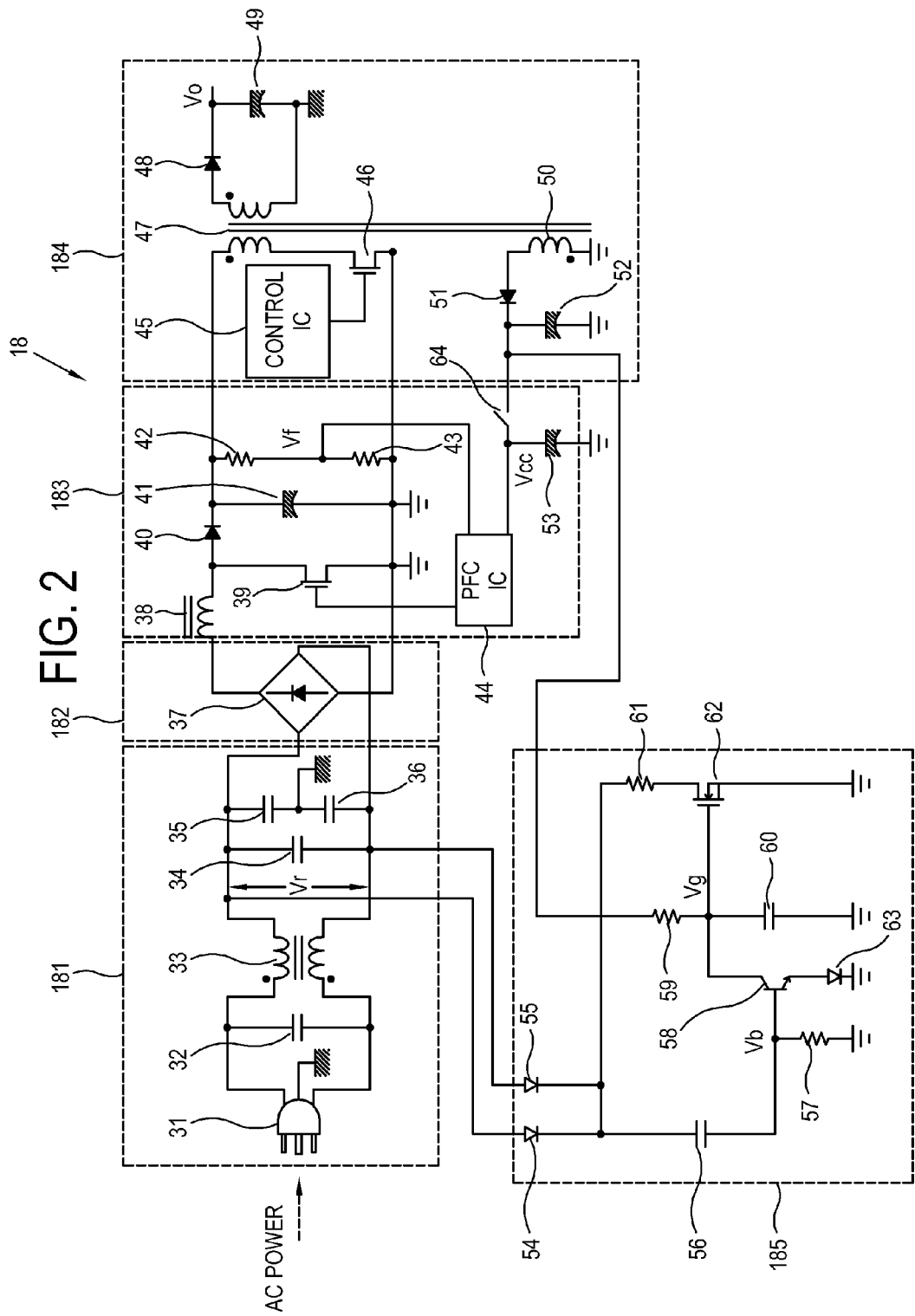
FIG. 2 is a circuit diagram showing a configuration of a power supply unit in the display apparatus of FIG. 1.

FIG. 2 is a circuit diagram showing a detailed configuration of the power supply unit 18 shown in FIG. 1. In this exemplary embodiment, as shown in FIG. 2, the power supply unit 18 may further include an AC filter part 181, a rectifier part 182, a power factor correction (PFC) circuit part 183 and a switching circuit part 184.

The AC filter part 181 filters input AC power to remove noise from the AC power. As shown in FIG. 2, the AC filter part 181 may include a first capacitor 32 across the power cord 31, a first transformer 33, a second capacitor 34, a fourth capacitor 35 and a fifth capacitor 36. In normal operation, the second capacitor 34 is charged with a predetermined level of voltage Vr.

The rectifier part 182 rectifies an alternating current (AC) output from the AC filter part 181 to convert the AC into a direct current (DC). The rectifier part 182 may be implemented by, for example, a bridge diode 37.

The PFC circuit part 183 includes a smoothing capacitor 41 for smoothing a DC voltage output by the rectifier part 182. In addition, the PFC circuit part 183 further includes an inductor 38, a first diode 40, a pair of feedback resistors 42 and 43, a first FET 39 and a PFC IC 44. The PFC IC 44 switches the first FET 39 with a predetermined frequency based on a voltage Vf fed back by the feedback resistors 42 and 43 to increase a voltage with which the smoothing capacitor 41 is charged, thereby increasing a power factor of the power supply unit 18.

The switching circuit part 184 converts a level of voltage output from the PFC circuit part 183 into an operation voltage Vo to be supplied to the display unit and so on. As shown in FIG. 2, the switching circuit part 184 includes a second transformer 47 coupled to an output stage of the PFC IC 44, a second FET 46 which is coupled in series to a primary coil side of the second transformer 47 for regulating a flow of current, a control IC 45 which switches the second FET 46, a second diode 48 which is coupled to a secondary coil side of the second transformer 47 for rectifying the output operation voltage Vo, and a sixth capacitor 49 which maintains a level of operation voltage Vo. The control IC 45 switches the second FET 46 such that the level of operation voltage Vo reaches a predetermined target value. The operation voltage Vo is a voltage required to operate the display part 13 and so on and its level is varied depending on which component is supplied with the operation voltage Vo. For example, the operation voltage Vo supplied with the control unit 17 such as a CPU or a microcomputer may be 5V or so. The number of operation voltages Vo may be one or more. If the number of operation voltages Vo is two or more, the switching circuit part 184 may further include the same components as or components similar to the secondary coil of the second transformer 47, the second diode 48 and the sixth capacitor 49 for each operation voltage Vo. In this case, different levels of plural operation voltages Vo may supplied to different components.

In one exemplary embodiment, the display apparatus 1 has a normal mode in which it operates normally such as displaying an image on the display unit 13 and a standby mode in which it consumes a minimum amount of power. The control IC 45 controls the second FET 46 so that a required level of operation voltage Vo can be supplied to a component required to be operated even in the standby mode, for example, a microcomputer (not shown) for performing a standby mode control.

The PFC circuit part 183 can be operated in the normal mode without being operated in the standby mode. In this connection, the power supply unit 18 may further include a tertiary coil 50, a third diode 51, a seventh capacitor 52, an eighth capacitor 53 and a power switch 64. A predetermined voltage is induced to the tertiary coil 50 by the secondary coil of the second transformer 47. The seventh capacitor 52 is charged with the voltage induced to the tertiary coil 50. The power switch 64 regulates coupling between the eighth capacitor 53, the third diode 51 and the seventh capacitor 52. When the power switch 64 is closed, the voltage with which the seventh capacitor 52 is charged is delivered to the eighth capacitor 53 or the eighth capacitor 53 is charged with the voltage induced to the tertiary coil 50. The eighth capacitor 53 is coupled to the PFC IC 44 to which the voltage of the eighth capacitor 53 is supplied as a PFC driving voltage Vcc.

The power switch 64 remains opened in the standby mode. In this state, since the PFC driving voltage Vcc cannot be supplied to the PFC IC 44, the PFC circuit part 183 remains turned off. On the other hand, when a user turns on the apparatus through the user input unit 15, a corresponding power-on signal is delivered to the power switch 64 so as to close the power switch 64. In this case, since the PFC driving voltage Vcc is supplied to the PFC IC 44, the PFC circuit part 183 is normally operated.

Hereinafter, the discharging circuit part 185 according to one exemplary embodiment will be described in detail. As shown in FIG. 2, the discharging circuit part 185 includes a discharging element 61, a first discharging diode 54, a second discharging diode 55 and a first switching element 62. The discharging element 61 discharges the power supply unit 18 to remove a residual voltage therefrom when the power cord 13 is unplugged during the normal mode, i.e., when the AC power is suspended. In this exemplary embodiment, the discharging element 61 may be implemented by a resistor. In this exemplary embodiment, one end of the discharging element 61 is coupled to both ends of the second capacitor 34 of the AC filter part 181 via the first discharging diode 54 and the second discharging diode 55, respectively. The other end of the discharging element 61 is grounded via the first switching element 62. The first switching element 62 may be implemented by a FET.

The first discharging diode 54 and the second discharging diode 55 have their respective anodes and cathodes whose directions are determined to allow a current to flow from the second capacitor 34 into the discharging element 61. Accordingly, if the first switching element 62 remains turned on, a residual voltage Vr with which the second capacitor 34 was charged causes the current to flow into the discharging element 61 via the first discharging diode 54 or the second discharging diode 55, i.e., the second capacitor 34 can be discharged to remove its residual voltage Vr therefrom.

Figure 3:
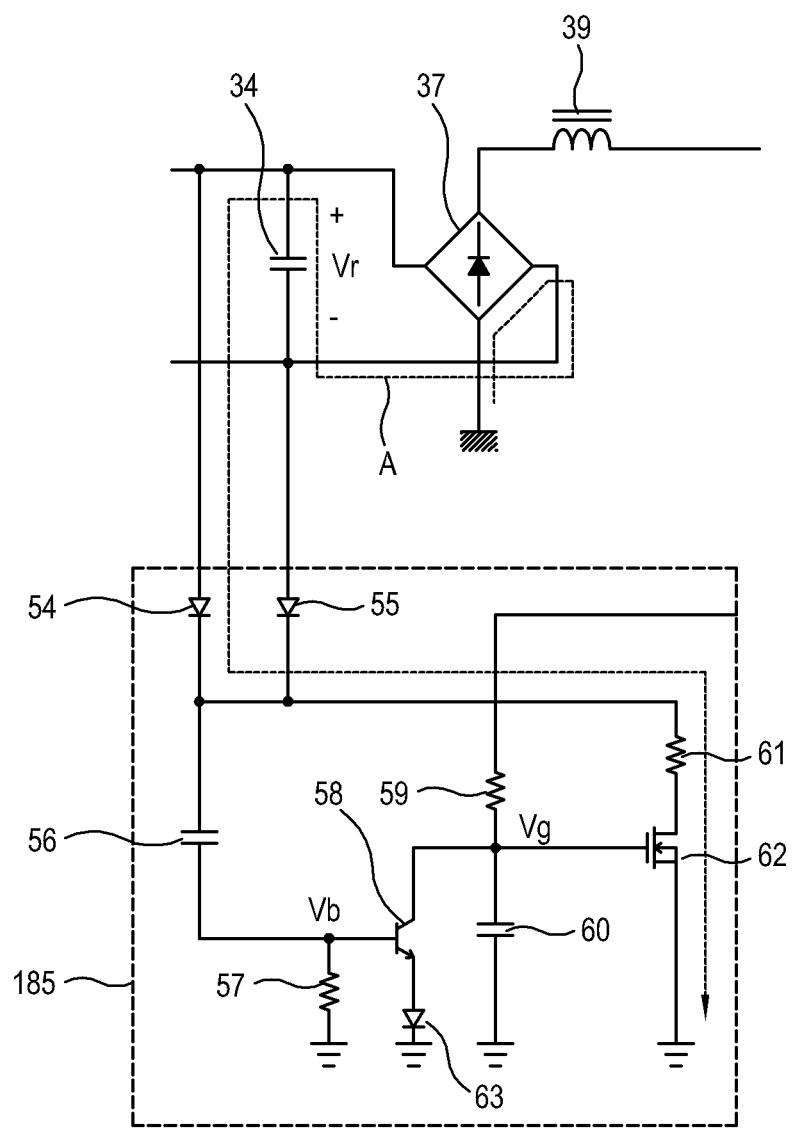
FIGS. 3 and 4 are diagrams showing a discharging path of a residual voltage in the power supply unit of FIG. 2.
Figure 4:
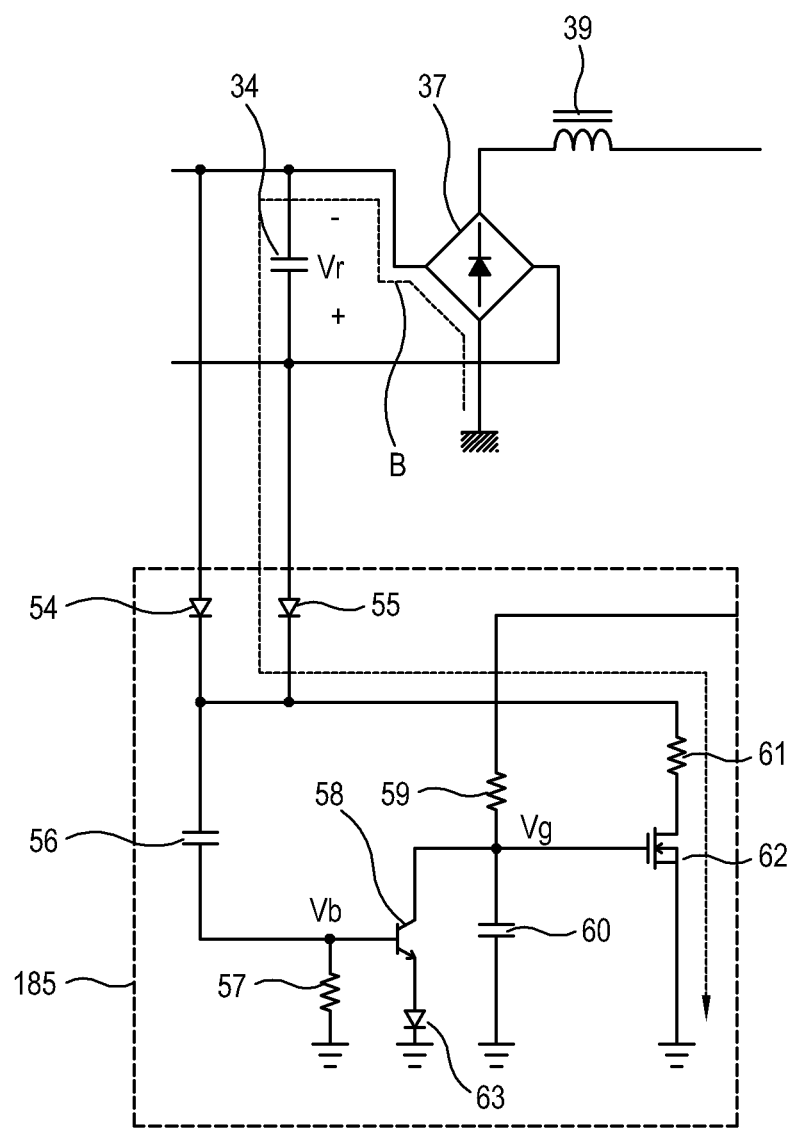

FIGS. 3 and 4 show a discharging path of the residual voltage Vr in the power supply unit 18 of FIG. 2. In FIGS. 3 and 4, other configurations which are out of the discharging path in the power supply unit 18 of FIG. 2 are omitted for the sake of convenience. Since the AC power applied to the second capacitor 34 is alternate, a polarity of the residual voltage Vr with which the second capacitor 34 has the same cycle as the AC power and is instantaneously changed.

First, FIG. 3 shows a state where the residual voltage Vr of the second capacitor 34 has a (+) polarity in its upper side and a (−) polarity in its lower side. In this state, the second capacitor 34 is discharged to remove the residual voltage Vr therefrom through a first discharging path A ranging from a ground of the bridge diode 37, through the bridge diode 37, the second capacitor 34, the first discharging diode 54, the discharging element 61, the first switching element 62, to a ground of the first switching element 62.

On the other hand, FIG. 4 shows a state where the residual voltage Vr of the second capacitor 34 has a (−) polarity in its upper side and a (+) polarity in its lower side. In this state, the second capacitor 34 is discharged to remove the residual voltage Vr therefrom through a second discharging path B ranging from a ground of the bridge diode 37, through the bridge diode 37, the second capacitor 34, the second discharging diode 55, the discharging element 61, the first switching element 62, to a ground of the first switching element 62.

Referring again to FIG. 2, a configuration of controlling the first switching element 62 such that a current flows or not through the discharging element 61 will be described in detail. As shown in FIG. 2, in this exemplary embodiment, the discharging circuit part 185 may further include a ninth capacitor 60 and a fourth resistor 59. The ninth capacitor 60 has one end coupled to a gate terminal of the first switching element 62 and the other end grounded. The one end of the ninth capacitor 60 is also coupled to a cathode of the third diode 51 via the fourth resistor 59. Accordingly, the ninth capacitor 60 can be charged with a voltage supplied from the third diode 51. The switching element 62 is operated depending on a level of voltage Vg with which the ninth capacitor 60 is charged. Specifically, if the voltage Vg with which the ninth capacitor 60 is charged is larger than an operation threshold voltage of the first switching element 62, the first switching element 62 is turned on. On the contrary, if the voltage Vg with which the ninth capacitor 60 is charged is smaller than the operation threshold voltage of the first switching element 62, the first switching element 62 is turned off. In one exemplary embodiment, the ninth capacitor 60 is a voltage charging element.

In this exemplary embodiment, the discharging circuit part 185 may further include a tenth capacitor 56, a third resistor 57, a second switching element 58 and a fourth diode 63. The second switching element 58 may be implemented by a transistor. A collector of the second switching element 58 is coupled to one end of the ninth capacitor 60 and an emitter of the second switching element 58 is grounded via the fourth diode 63. Accordingly, if the second switching element 58 remains turned on, the ninth capacitor 60 is discharged to remove its voltage Vg therefrom via the second switching element 58 and the fourth diode 63.

The tenth capacitor 56 has one end coupled to cathodes of the first discharging diode 54 and the second discharging diode 55 and the other end coupled to one end of the third resistor 57. In addition, a base of the second switching element 58 is coupled to the other end of the tenth capacitor 56 and the other end of the third resistor 57 is grounded. The second switching element 58 is operated depending on a level of voltage Vb applied to the third resistor 57. Specifically, if the voltage Vb applied to the third resistor 57 is larger than an operation threshold voltage of the second switching element 58, the second switching element 58 is turned on. On the contrary, if the voltage Vb applied to the third resistor 57 is smaller than the operation threshold voltage of the second switching element 58, the second switching element 58 is turned off. In one exemplary embodiment, a combination of the ninth capacitor 60, the fourth resistor 59, the tenth capacitor 56, the third resistor 57, the second switching element 58 and the fourth diode 63 constitutes a switch control part. In addition, in one exemplary embodiment of the present invention, a combination of the tenth capacitor 56 and the third resistor 57 constitutes an RC circuit part.

A process of discharging the second capacitor 34 to remove the residual voltage Vr therefrom or preventing it from being discharged depending on whether or not the AC power is input is as follows. First, when the power cord 31 is plugged in to input the AC power, a current by the AC power is supplied through the tenth capacitor 56. In this case, since the voltage Vb applied to the third resistor 57 is varied with the same period as the AC power and its level passes above or below the operation threshold voltage of the second switching element 58 at the same period, the second switching element 58 remains turned on or alternates between turn-on and turn-off. With the second switching element 58 turned on, the ninth capacitor 60 charged with the voltage Vg is discharged via the second switching element 58. Accordingly, since the level of voltage Vg with which the ninth capacitor 60 is charged cannot reach the operation threshold voltage of the first switching element 62, the first switching element 62 is turned off. This results in prevention of current from flowing into the discharging element 61 and prevention of the second capacitor 34 charged with the residual voltage Vr from being discharged.

Accordingly, when the AC power is input, it is possible to prevent wasteful power consumption from being generated due to the discharging element 61 by preventing the second capacitor 34 charged with the residual voltage Vr from being discharged. In particular, it is possible to make an effective standby power design to minimize power consumption for the standby mode or the like.

On the other hand, when the power cord 31 is unplugged to suspend the AC power, the residual voltage Vr of the second capacitor 34 has a DC level. Such a DC residual voltage Vr is blocked by the tenth capacitor 56 and thus the voltage Vb applied to the third resistor 57 becomes smaller than the operation threshold voltage of the second switching element 58. Accordingly, the second switching element 58 is turned off and the ninth capacitor 60 charged with the voltage Vg can be sufficiently charged up to a level higher than the operation threshold voltage of the first switching element 62. Accordingly, the first switching element 62 is turned on to allow a current to flow into the discharging element 61 and discharge the second capacitor 34 charged with the residual voltage VR.

This ensures safety of a user by discharging the second capacitor 34 charged with the residual voltage VR using the discharging element 61 even when the power cord 31 is unplugged.

Figure 5:
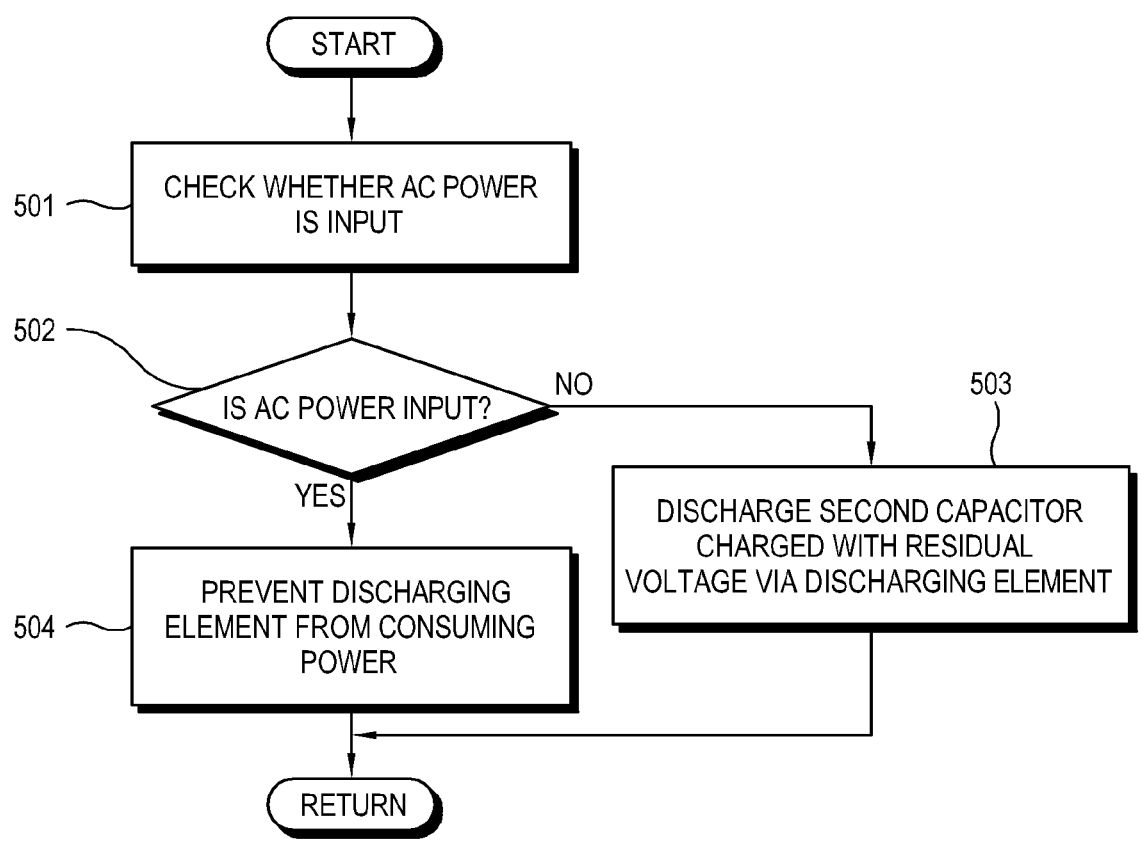
FIG. 5 is a flow chart showing an operation of the display apparatus of FIG. 1.

FIG. 5 is a flow chart showing an operation of the discharging circuit part 185 according to one exemplary embodiment. First, the discharging circuit part 185 checks whether or not AC power is input (501). If it is determined that the AC power is input (502-Y), the discharging element 61 is prevented from consuming power by preventing the second capacitor 34 charged with the residual voltage Vr from being discharged (504). On the contrary, if it is determined that the AC power is suspended (502-N), the second capacitor 34 charged with the residual voltage Vr is discharged via the discharging element 61 (503).

Although a few exemplary embodiments have been shown and described, it will be appreciated by those skilled in the art that changes may be made in these exemplary embodiments without departing from the principles and spirit of the invention, the scope of which is defined in the appended claims and their equivalents. For example, although it has been illustrated in the above exemplary embodiments that the power supply unit 18 is implemented as one component of the display apparatus 1, a separated power supply device (not shown) having the same configuration as or configuration similar to the power supply unit 18 may be implemented to supply the operation power to the display apparatus according to different exemplary embodiments. Further, a target to which the operation power may be supplied from the power supply device according to one exemplary embodiment may be not only the display apparatus but also other different types of electronic apparatuses.

What is claimed is:

1. A display apparatus comprising:
a signal receiving unit which receives an image signal;
a signal processing unit which processes the image signal received by the signal receiving unit;
a display unit which displays an image based on the image signal processed by the signal processing unit; and
a power supply unit which receives AC power and supplies operation power to the display unit,
and comprises:
an AC filter part which filters the AC power and comprises a first voltage charging part which is charged with a residual voltage,
a rectifier part which rectifies an output current of the AC filter part to supply the operation power from an output voltage of the rectifier part, and
a discharging circuit part comprising:
a discharging element which discharges the residual voltage of the AC filter part when the AC power is suspended,
a first diode which is provided on a first discharging path and is connected to one side of the first voltage charging part and to the discharging element,
a second diode which is provided on a second discharging path and is connected to other side of the first voltage charging part and to the discharging element,
a first switching part which regulates a flow of current passing through the discharging element; and
a switch control part which controls the first switching part to prevent current from flowing through the discharging element when the AC power is input,
wherein the residual voltage discharges through the first discharging path when the AC power is positive and discharges through the second discharging path when the AC power is negative.

2. The display apparatus according to claim 1, wherein the switch control part comprises:
a second voltage charging part which is charged with a turn-on voltage to turn on the first switching part;
a second switching part which regulates a discharging path of the turn-on voltage charged in the second voltage charging part; and
an RC circuit part which controls the second switching part to discharge the turn-on voltage charged in the second voltage charging part when the residual voltage is a DC voltage.

3. The display apparatus according to claim 2, wherein the RC circuit part controls the second switching part so that the first switching part can be turned off by the turn-on voltage of the second voltage charging part in a standby mode.

4. The display apparatus according to claim 2, wherein the power supply unit further comprises a switching circuit part that charges the second voltage charging part with the turn-on voltage to turn-on the first switching part.

5. A power supply apparatus for an electronic apparatus, the power supply apparatus comprising:
an AC filter part which receives and filters input AC power and comprises a first voltage charging part which is charged with a residual voltage;
a rectifier part which rectifies an output current of the AC filter part;
a switching circuit part which converts an output voltage of the rectifier part into an operation voltage of the electronic apparatus; and
a discharging circuit part comprising:
a discharging element which discharges the residual voltage from the AC filter part when the AC power is suspended,
a first diode which is provided on a first discharging path and is connected to one side of the first voltage charging part and to the discharging element,
a second diode which is provided on a second discharging path and is connected to other side of the first voltage charging part and to the discharging element,
a first switching part which regulates a flow of current passing through the discharging element, and
a switch control part which controls the first switching part to prevent current from flowing through the discharging element when the AC power is input,
wherein the residual voltage discharges through the first discharging path when the AC power is positive and discharges through the second discharging path when the AC power is negative.

6. The power supply device according to claim 5, wherein the switch control part comprises:
a second voltage charging part which is charged with a turn-on voltage to turn on the first switching part;
a second switching part which regulates a discharging path of the turn-on voltage charged in the second voltage charging part; and
an RC circuit part which controls the second switching part to discharge the turn-on voltage charged in the second voltage charging part when the residual voltage is a DC voltage.

7. The power supply device according to claim 6, wherein the RC circuit part controls the second switching part so that the first switching part can be turned off by the turn-on voltage of the second voltage charging part in a standby mode.

8. The power supply device according to claim 6, wherein the switching circuit part charges the second voltage charging part with the turn-on voltage to turn on the first switching part.

9. A power supplying method of receiving AC power and supplying operation power to an electronic apparatus, the power supplying method comprising:
filtering the received AC power by an AC filter part of a power supply unit;
rectifying an output current of the AC filter part to supply the operation power from an output voltage of a rectifier part of the power supply unit;

checking whether the AC power is input; and discharging a residual voltage of the AC filter part from the power supply unit using a discharging element when the AC power is suspended, and preventing a current from flowing through the discharging element when the AC power is input, wherein the discharging comprises discharging the residual voltage from the power supply unit through a first discharging path when the AC power is positive and discharging the residual voltage from the power supply unit through a second discharging path when the AC power is negative.

10. The power supplying method according to claim 9, wherein the preventing comprises preventing the current from flowing through the discharging element when the residual voltage is a DC voltage.

11. The power supplying method according to claim 10, wherein the preventing comprises preventing the current from flowing through the discharging element in a standby mode.

* * * * *